United States Patent [19]

Natarajan

[11] Patent Number: 5,249,261
[45] Date of Patent: Sep. 28, 1993

[54] FAILURE HISTORY TABLE FOR OPTIMIZING BACKTRACK SEARCHES

[75] Inventor: Kadathur S. Natarajan, Millwood, N.Y.

[73] Assignee: International Business Machines Corporation, Armonk, N.Y.

[21] Appl. No.: 966,601

[22] Filed: Oct. 26, 1992

Related U.S. Application Data

[63] Continuation of Ser. No. 799,007, Nov. 25, 1991, abandoned, which is a continuation of Ser. No. 485,101, Feb. 26, 1990, abandoned.

[51] Int. Cl.$^5$ .................... G06F 15/18; G06F 9/44 K
[52] U.S. Cl. ...................................................... 395/51
[58] Field of Search ........................................ 395/51

[56] References Cited

U.S. PATENT DOCUMENTS 4,862,498  8/1989  Reed ................................. 379/355
4,918,621  4/1990  Nado et al. ...................... 364/513

OTHER PUBLICATIONS

Tanimoto, The Elements of Artificial Intelligence, Computer Sci. Press, 1987, pp. 139–176.
Horowitz et al., Fundamentals of Data Structures in Pascal, Comp. Sci. Press, 1984, pp. 417–419, 452–467.
Peterson et al., Operating System Concepts 2nd ed., Addison-Wesley Pub., 1985, pp. 217–228.
Clocksin et al., Programming in Prolog 2nd ed., Springer-Verlag, 1984, pp. 206–209.
Barr et al., The Handbook of Artificial Intelligence vol. I, HeurisTech Press., 1981, pp. 58–62.
Minasi, M., "Making Searches More Efficient", AI Expert, Dec. 1988, pp. 21–24.
Minasi, M. "Optimal Searches and a Challenge", AI Expert, Jan. 1989, pp. 21–23.
Exercise: "Problem Set #2" and respective solution listing, for computer science course taken 1987.
"Balanced Binary Tree (BBT) Subroutine Library", for computer science course taken 1987.
IEEE Int. Workshop on Tools for Artificial Intelligence, Architectures, Languages and Algorithms. Oct. 23, 1989, IEEE, Los Alamitos, Calif. USA pp. 482–489; Vishv Mohan Malhotra et al: "A History-Based Scheme for Accelerating Prolog Interpretation".
IBM Technical Disclosure Bulletin, vol. 31, No. 1, Jun. 1988, New York US pp. 415–417; "Adaptive Optimization of Recursive Search Trees".
8th Int. Workshop on Expert Systems and Their Applications. May 30, 1989, EC2, Nanterre, France pp. 365–381; Ali Belkhiri: "Efficacite en Prolog avec backtracking intelligent et apprentissage'".
The Fourth Conf. on Artificial Intelligence Applications, Mar. 14, 1988, IEEE Comp. Soc. Press Washington, USA pp. 312–319 Rina Dechter: "Constraint Processing Incorporating Backjumping, Learning and Cutset-Decomposition".
B. A. Dudel, "Consistent-Labeling Problems and Their Algorithms: Expected-Complexities and Theory Based Heuristics", Artificial Intelligence (Special Issue on Search & Heuristics), vol. 21, pp. 135–178, 1983.
R. M. Haralick & G. L. Elliott, "Increasing Tree Search Efficiency for Constraint Satisfaction Problems", Artificial Intelligence, pp. 263–313, 1980.

Primary Examiner—Michael R. Fleming
Assistant Examiner—Robert W. Downs
Attorney, Agent, or Firm—Perman & Green

[57] ABSTRACT

Method and apparatus for improving an efficiency of solution of constraint-satisfaction type problems performed with a digital computer. A method includes the steps of creating a data structure having storage allocated for a plurality of entries, each of the entries having a plurality of attribute fields, including a Binding_set attribute, a Potential_savings attribute and an Accumulated_savings attribute. The method further includes a step of inserting entries into the data structure in response to an occurrence of a failure path identified during a backtrack search of a search tree structure. The method also includes a step of examining the entries of the data structure during a backtrack search in order to avoid paths of the tree structure that are repetitively identified to be failure paths. The step of examining occurs before a forward move from a node of the search tree and determines if a value of a current set of bindings associated with a path from a root node to a current node is already present within the Binding_set attribute of an entry in the data structure. If present, the search backtracks to a father node of the current node thereby avoiding a previously identified failure path.

15 Claims, 10 Drawing Sheets

FAILURE HISTORY TABLE FOR OPTIMIZING BACKTRACK SEARCHES

This is a continuation of copending application Ser. No. 07/799,007 filed on Nov. 25, 1991, now abandoned, which is a continuation of copending application Ser. No. 07/485,101 filed on Feb. 26, 1990, now abandoned.

FIELD OF THE INVENTION

This invention relates generally to methods implemented with a digital computer for optimizing solutions to classes of problems known as constraint-satisfaction problems. In particular, the invention relates to (a) methods of creating and maintaining a table that records information relating to failure paths encountered during a backtrack search and (b) methods of using the table such that more frequently encountered failure paths tend to be avoided during a solution of future instances of a particular constraint-satisfaction problem.

BACKGROUND OF THE INVENTION

Applications of logic programming and discrete optimization are often formulated as Constraint Satisfaction Problems. A Constraint Satisfaction Problem typically requires that an arbitrary set of constraints be satisfied. A search procedure is employed to enumerate all problem solutions that simultaneously satisfy all constraints on the problem.

A depth-first type search with backtracking is known as a search strategy to enumerate all solutions to a problem. A depth-first type search is one accomplished using a top-down, left-to-right search strategy. As an example, H. S. Stone et al. discuss a backtrack searching technique in an article "Efficient Searching Technique", IBM Technical Disclosure Bulletin, Vol. 30, No. 1, 6/87, pp. 146-148. The Stone et al. article discloses a rule for determining an expansion sequence for a search, wherein an expansion sequence is defined to be a sequence in which abstract objects are examined in a search tree.

It has been found when a sequence of problem instances is solved that the search trees for different problem instances tend to have considerable overlap. However, in a commonly used form of backtrack search, the experience gained in solving one instance of a problem is not used for possible reduction of processing effort in solving other instances of the problem. Thus, with known techniques, no systematic learning takes place. Attempts to improve backtrack search efficiency have generally focused on solving each instance of a problem independently of previous instances of the problem. However, these techniques do not consider optimizing the average efficiency over a sequence of problem instances.

In commonly assigned U.S. Pat. No. 4,752,890, Jun. 21, 1988, "Adaptive Mechanisms for Execution of Sequential Decision", Natarajan and Stone teach that systematic learning of performance parameters during program execution can be used to create adaptive search techniques leading to improved performance in future use of the system. U.S. Pat. No. 4,752,890 furthermore teaches an adaptive search technique that relies on monitoring a performance history of various search alternatives for making decisions on how best to reorder the alternatives so that an average search execution cost is minimized. The class of problems addressed by this U.S. Patent however are not constraint-satisfaction problems where a set of all solutions is found but are instead problems of the type wherein a single solution is found.

It is thus an object of the invention to provide a method for enhancing the performance of a system that is employed to solve instances of a constraint-satisfaction problem.

It is a further object of the invention to provide methods for optimizing backtrack searching techniques, the method employing a failure history table for recording search-related information for examination during a subsequent search.

SUMMARY OF THE INVENTION

The foregoing problems are overcome and other advantages are realized by, in accordance with the invention, apparatus and method for improving an efficiency of solution of constraint-satisfaction type problems performed upon a digital computer. The method includes the steps of creating a data structure having storage allocated for a plurality of entries, each of the entries having a plurality of attribute fields, including a Binding_set attribute, a Potential_savings attribute and an Accumulated_savings attribute. The method further includes a step of inserting entries into the data structure in response to an occurrence of a failure path identified during a backtrack search of a tree structure. The method also includes a step of examining the entries of the data structure during a backtrack search in order to avoid paths of the tree structure that are repetitively identified to be failure paths. The step of examining occurs before a forward move from a node of the search tree. A search technique determines if a value of a current set of bindings corresponding to a path from a root node of the search tree to a present node is already present within a Binding_set attribute of an entry in the failure history table. If present, the value associated with the Accumulated_savings attribute for the identified entry is incremented by the value of the Potential_savings attribute of the identified entry. The search then backtracks to a father node of the present node thereby avoiding a previously identified failure path. If instead no matching entry is found the search continues in the forward direction.

BRIEF DESCRIPTION OF THE DRAWING

The above set forth and other features of the invention will be made more apparent in the ensuing Detailed Description of the Invention when read in conjunction with the attached Drawing, wherein:

FIG. 5 is a flowchart illustrating a first variation of the method shown in FIG. 2a;

FIG. 6 is a flowchart illustrating a second variation of the method shown in FIG. 2a;

DETAILED DESCRIPTION OF THE INVENTION

Applications benefiting from the teaching of the invention frequently solve, by way of a digital data processor, constraint-satisfaction problems of the following generic form:

$$G(S) = P_1(S_1) \& P_2(S_2) \& \ldots P_M(S_M),$$

where $G(S)$ is the problem to be solved and $S = \{X_1, X_2 \ldots, X_N\}$ is a set of N argument variables. For $1 \leq i \leq M$, $P_i(S_i)$ is the $i^{th}$ subproblem with arguments $S_i$, where $S_i \subseteq S$. A solution to problem G is a binding of constants to each of the arguments of $P_1, P_2, \ldots, P_M$ such that a) each subproblem $P_i$ is solved, and b) each argument that is common to two or more subproblems is consistently bound to a constant value. Two solutions are distinct if the bindings are different, i.e., at least one argument is bound to two different values in the two bindings.

Figure 1A:
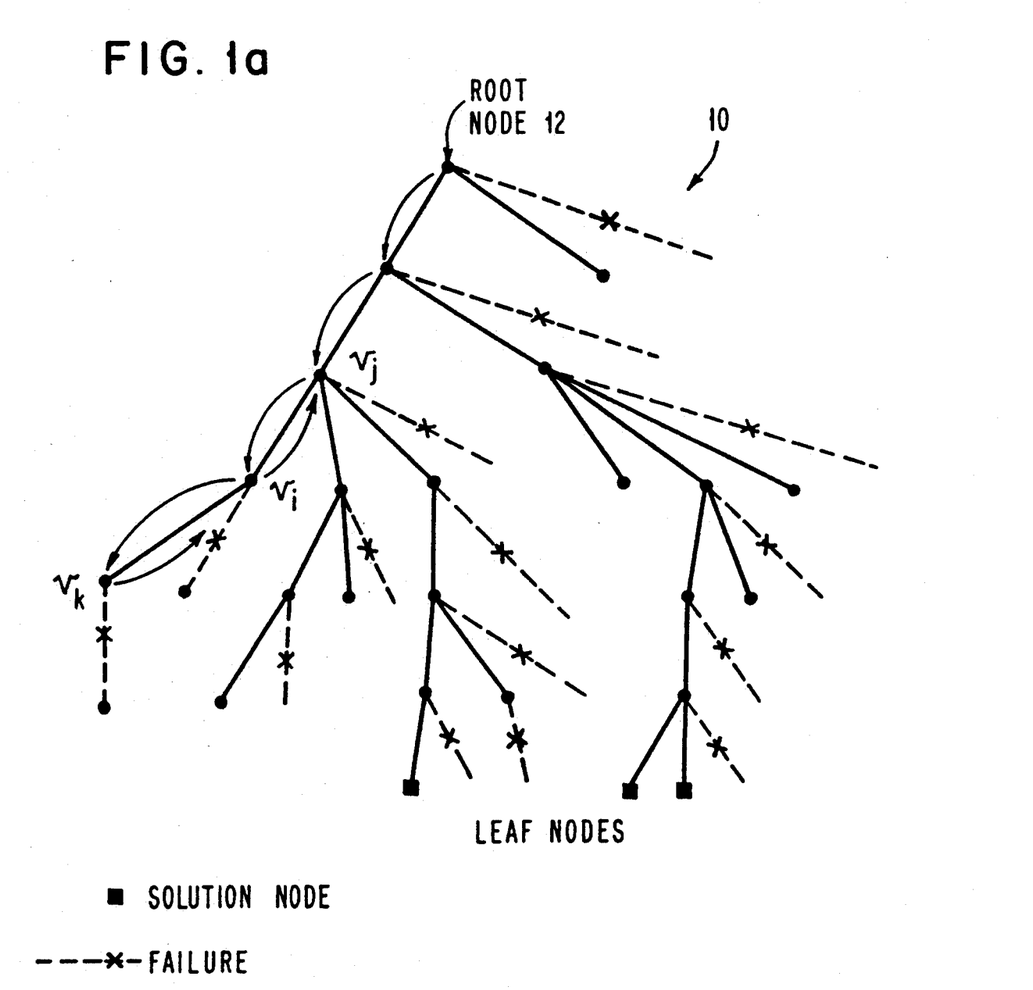
FIG. 1a illustrates a typical backtrack search tree.

By example, in an instance of a constraint-satisfaction problem one is given the bindings of a subset of S and the search procedure is required to enumerate all the consistent bindings for the remainder of S. A search tree 10 of the type illustrated in FIG. 1a is utilized by the search procedure. The search tree 10 has a root node 12. Movement along the tree 10 towards the leaf nodes is referred to as forward searching while movement towards the root node 12 is referred to as backtracking. By convention a node of the tree that has one or more descendents is referred to a "father node" and each of the descendents is referred to as a "child node". By example, in FIG. 1a node $v_j$ is the father node of node $v_i$ which in turn is the father node of node $v_k$.

Figure 1B:
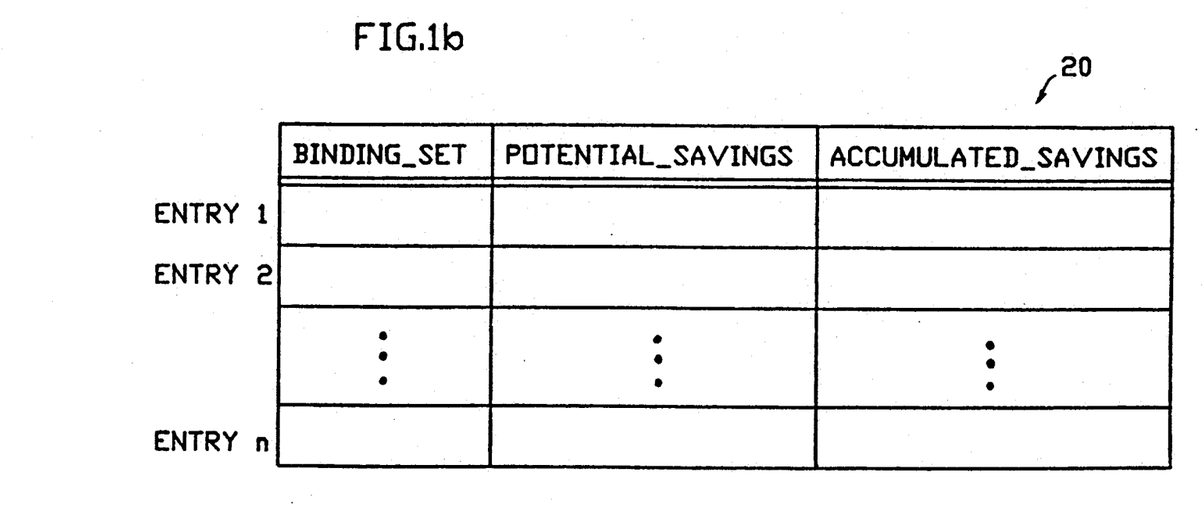
FIG. 1b illustrates the format of a data structure referred to herein as a Failure History Table.

One aspect of the invention relates to the creation and maintenance of a data structure within a memory of a digital data processor employed to solve the constraint-satisfaction problem. The data structure is referred to herein as a Failure History Table 20. The format of the Failure History Table 20 is illustrated in FIG. 1b. The Failure History Table 20 is employed to record a finite amount of information regarding failure paths encountered during a backtrack search. Another aspect of the invention relates to a method of using the Table 20 such that more frequently encountered failure paths tend to be avoided during the solution of future instances of a constraint-satisfaction problem.

Figure 1C:
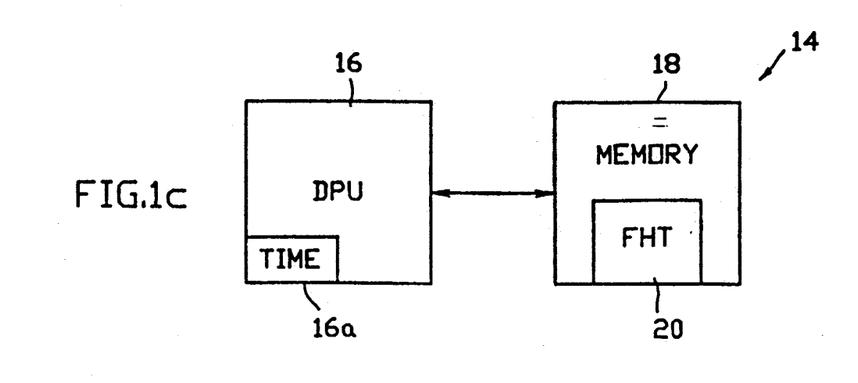
FIG. 1c illustrates in block diagram form one embodiment of a data processing system suitable for implementing the invention.

FIG. 1c illustrates in block diagram form one illustrative embodiment of a data processing system 14 suitable for implementing the invention. System 14 includes a Data Processing Unit (DPU) 16 bidirectionally coupled to a memory 18. Memory 18 stores the data structure referred to above as the Failure History Table (FHT) 20. Memory 18 also stores other data, such as data expressive of the search tree 10, and stores DPU instructions operable for executing backtrack tree search procedures including instructions for implementing the method of the invention. DPU 16 includes or has access to a source of time (TIME 16a) and reads same while executing a backtrack search as is described in detail below. It should be realized that the invention is not to be construed to be limited to only such an embodiment but may be practiced with a number of different data processing environments, including distributed processor and/or distributed memory type architectures.

Figure 2A:
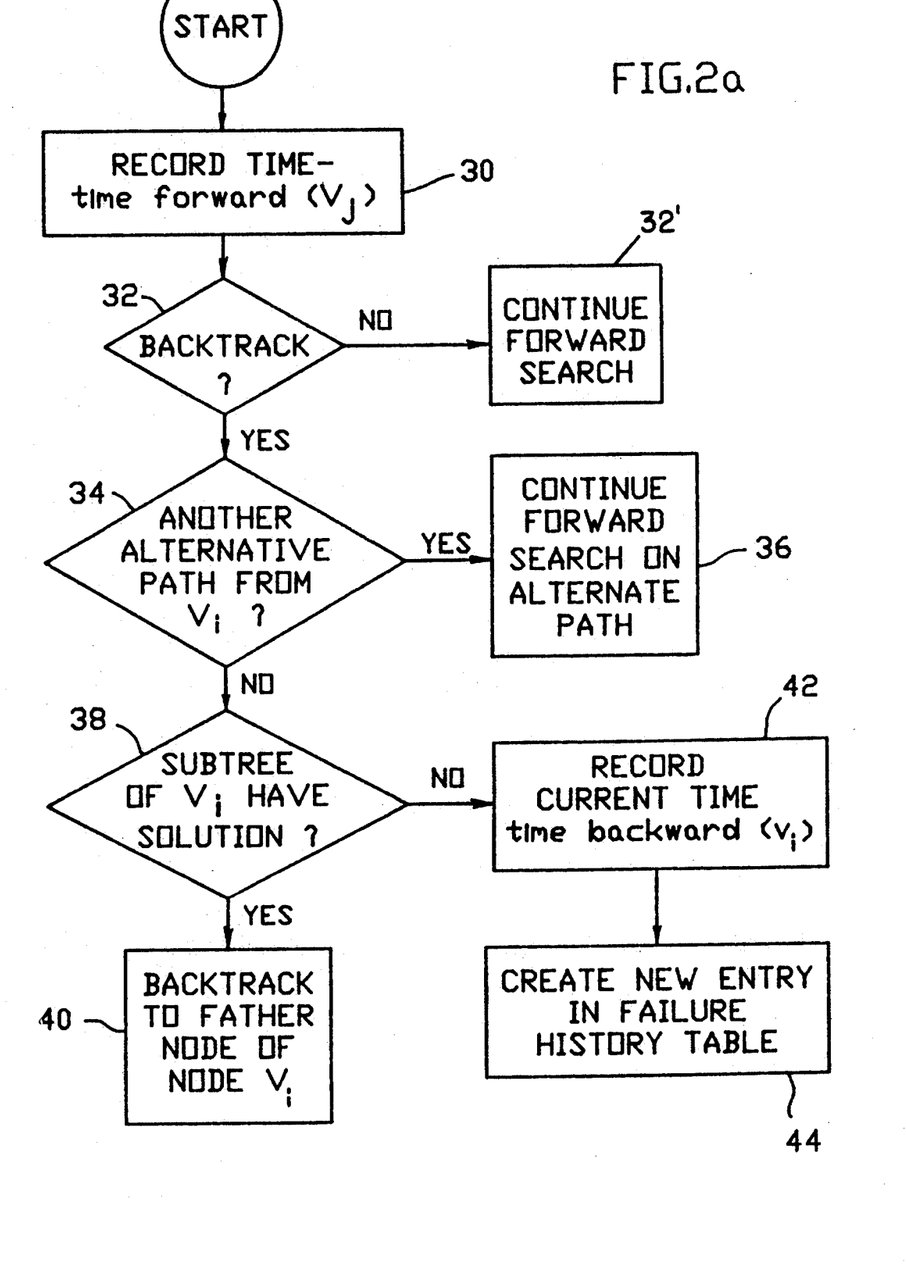
FIG. 2a is a flowchart illustrating a method of creating entries in the Failure History Table.
Figure 2B:
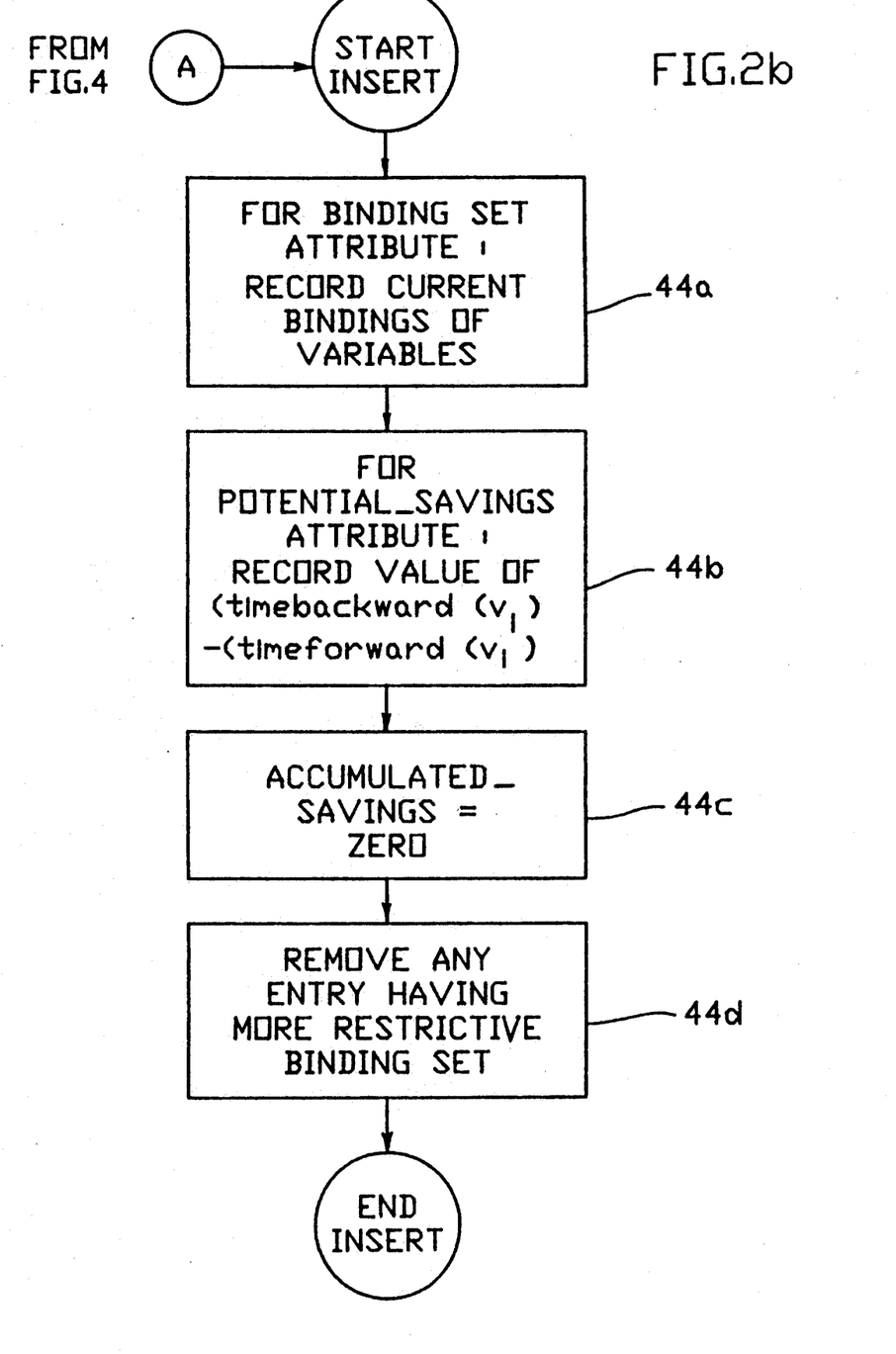
FIG. 2b illustrates in greater detail the block 44 of FIG. 2a, specifically the steps associated with creating a new entry within the Failure History Table.

A method of the invention creates and inserts entries within the data structure referred to herein as the Failure History Table 20. Each of the Entries 1 through n of the Table 20 has at least three attributes or components including a Binding_set attribute, a Potential_savings attribute and an Accumulated_savings attribute. Initially, all entries in the Failure History Table 20 are set to null. The following method, as shown in FIGS. 2a and 2b, is employed for inserting entries into the Table 20.

It is assumed that an instance of a particular constraint-satisfaction problem, such as the N-Queens Problem described below, is presented to the system 14 wherein the problem is to be solved. Before a first forward move from a node, say $v_j$ of the backtrack search tree 10 shown in FIG. 1a, the system records (block 30) in a memory 18 location, such as a stack location, a current system clock time obtained from TIME 16a. This recorded time is referred to as (timeforward($v_j$)) for the node $v_j$. If a backtrack is not required the method continues with the forward search (block 32'). After each backtrack move (block 32), the following actions are taken.

Assuming that the search backtracks to the node $v_i$ from the node $v_k$. A check is made to determine if there is another alternative path emanating from node $v_i$ (block 34). If yes, this alternate path is followed in the forward direction (block 36). If there is no alternative path emanating from $v_i$ then the following steps are performed. If the subtree rooted at node $v_i$ contained at least one solution (block 38), then the method backtracks to the father node of node $v_i$ in the search tree (block 40). As was stated, the father node of node $v_i$ in FIG. 1a is the node $v_j$.

The case of interest however is the case wherein the subtree rooted at $v_i$ contains no solution. The method of the invention exploits this case to minimize future processing effort.

Specifically, if the subtree rooted at node $v_i$ contained no solution there is recorded the current clock time (timebackward($v_i$)) (block 42) and a new entry (block 44) in the Failure History Table 20 is created to record which search state forces a backtrack. Block 44 contains additional steps shown in FIG. 2b as blocks 44a, 44b, 44c and 44d. In addition, an initial test is made (FIG. 4) to determine if the Table 20 is full, as will be described.

Continuing with FIG. 2b, for the attribute Binding set there is recorded in the Table 20 a value of the current bindings of variables involved in the path from the root node 12 to the node $v_i$ in the search tree 10. There is also assigned to the Potential_savings attribute the value of (timebackward($v_i$)) − (timeforward($v_i$)). The Accumulated_savings attribute is assigned a null value. After creating the new entry, there is removed from the table any currently existing entry whose binding set is more restrictive than that of the entry just inserted. In this regard a binding set $S_x$ is considered more restrictive than another binding set $S_y$ if the variables and their associated bound values in $S_y$ are a subset of the variables and their associated values in $S_x$.

When subsequent instances of the constraint-satisfaction problem are solved, the information contained within the Failure History Table 20 is used and maintained as follows.

Figure 3:
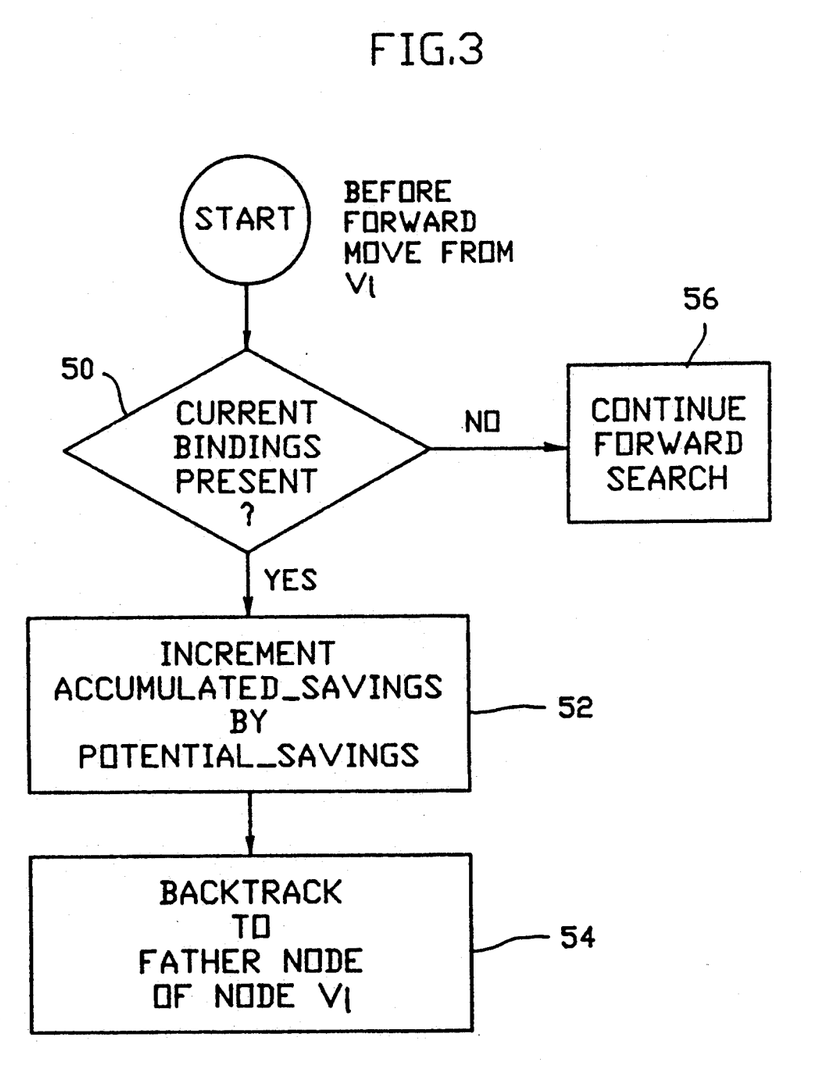
FIG. 3 is a flowchart illustrating a method of updating entries in the Failure History Table.

FIG. 3 illustrates in block diagram form an update policy or method for using the Table 20. Before each forward move from a node, say node $v_i$, the search method determines if a value of the current set of bindings corresponding to the path from the root node 12 to node $v_i$ is already present within a Binding_set attribute of an entry in the Failure History Table 20 (block 50). If true, the value of the Accumulated_savings attribute for the identified entry is incremented by the value of the Potential_savings attribute of the identified entry (block. 52). The search then backtracks to the father node of node $v_i$ in the backtrack search tree (block 54) thereby avoiding, in accordance with the invention, a previously identified failure path. If instead no matching entry is found at block 50 in the Failure History Table 20 then the search continues in the forward direction (block 56) as described in the previous paragraph.

Figure 4:
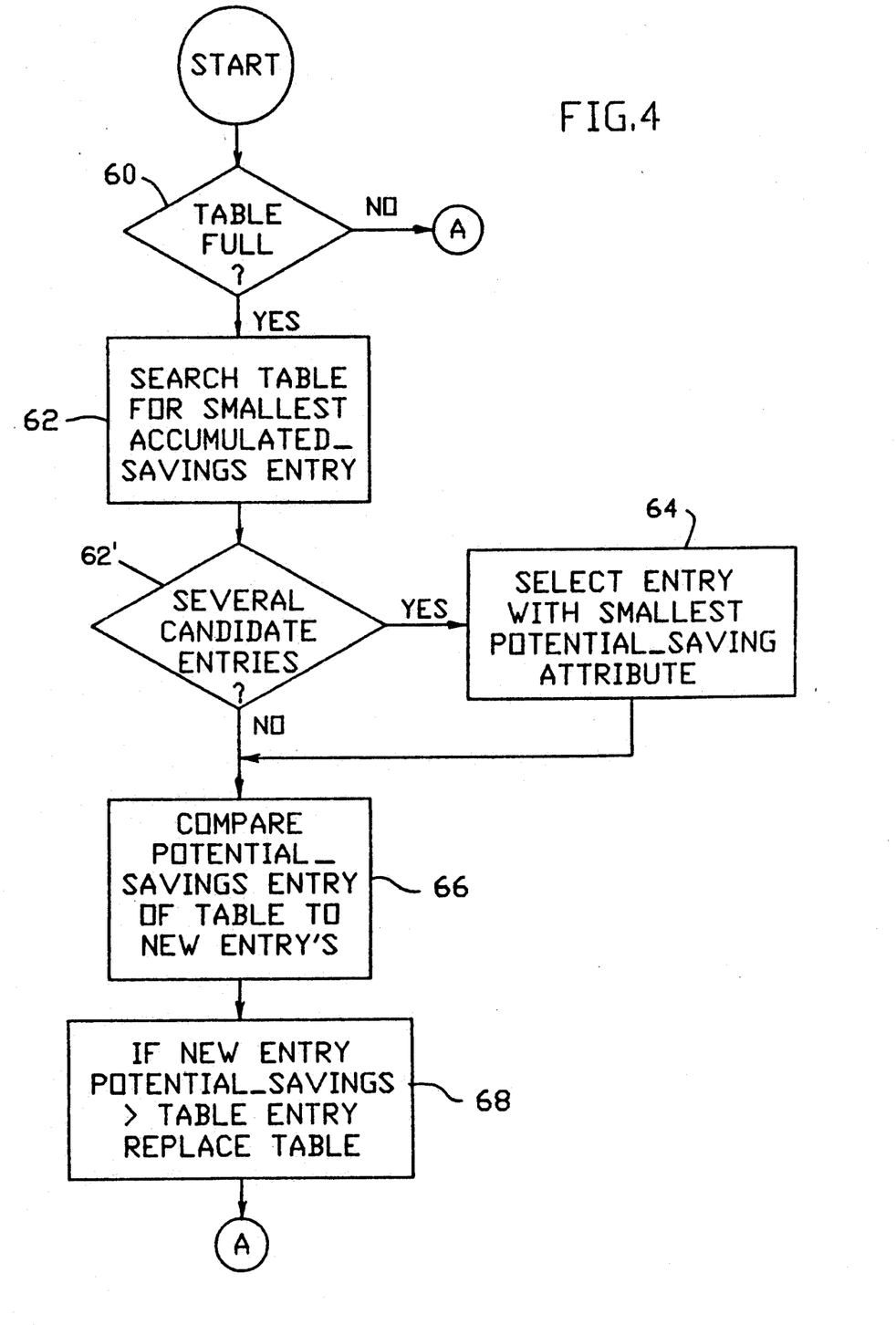
FIG. 4 is a flowchart illustrating a method of responding to an overflow condition of the Failure History Table.

FIG. 4 illustrates an Overflow Handling Policy or method for the Failure History Table 20. If the Failure History Table 20 is determined to be full during an attempt to insert a new entry into it (block 60) the search method executes the following steps. A search is performed on Table 20 to identify an entry having the smallest value for the Accumulated_savings attribute (block 62). If there are several candidates (block 62'), then one of the candidate entries having the smallest value for the Potential_savings attribute is chosen (block 64). The value of the Potential_Savings attribute of the identified Table 20 entry is compared with the value of the Potential_Savings attribute of the entry to be inserted (block 66). If the latter is larger, then it replaces the former in the Table 20 (block 68). If the former is larger then the new entry is not inserted into the Table 20.

In this regard a maximum number of possible entries for the Table 20 is, in general, application specific and depends on such criteria as the height of the search tree and/or the amount of memory available within the data processing system. One possible value is c(x), where (x) is the height of the search tree and (c) is a constant.

The following is representative of the extent of performance improvement achieved by recording failures in a Failure History Table in accordance with the invention. A time was measured for generating all solutions to a prototypical constraint-satisfaction problem, namely, the N-Queens problem. Briefly, the N-Queens problem concerns the placement of N-Queens on an NxN checkerboard so that no queen can take another. For N=6, the time to generate all solutions was measured to be 173 milliseconds. Failure paths that did not exceed a length of two were recorded in a Failure History Table. With this information in the Failure History Table, the time to generate all solutions was reduced to 62 milliseconds, an improvement factor of 2.79 to 1. For N=8, the time to generate all solutions was measured to be 6.488 seconds. Failure paths that did not exceed a length of three were recorded in a Failure History Table. With this information in the Failure History Table, the time to generate all solutions reduced to 3.59 seconds, an improvement factor of 80%. It is noted that the above improvement figures take into account the runtime overhead needed to use the Failure History Table. In practice, the extent of performance improvement depends on the statistics characterizing the usage of the problem.

The invention further provides several variations to the Failure History Table methods described above. In particular, the insertion policy as well as the replacement policy can be modified as described below.

Figure 5:
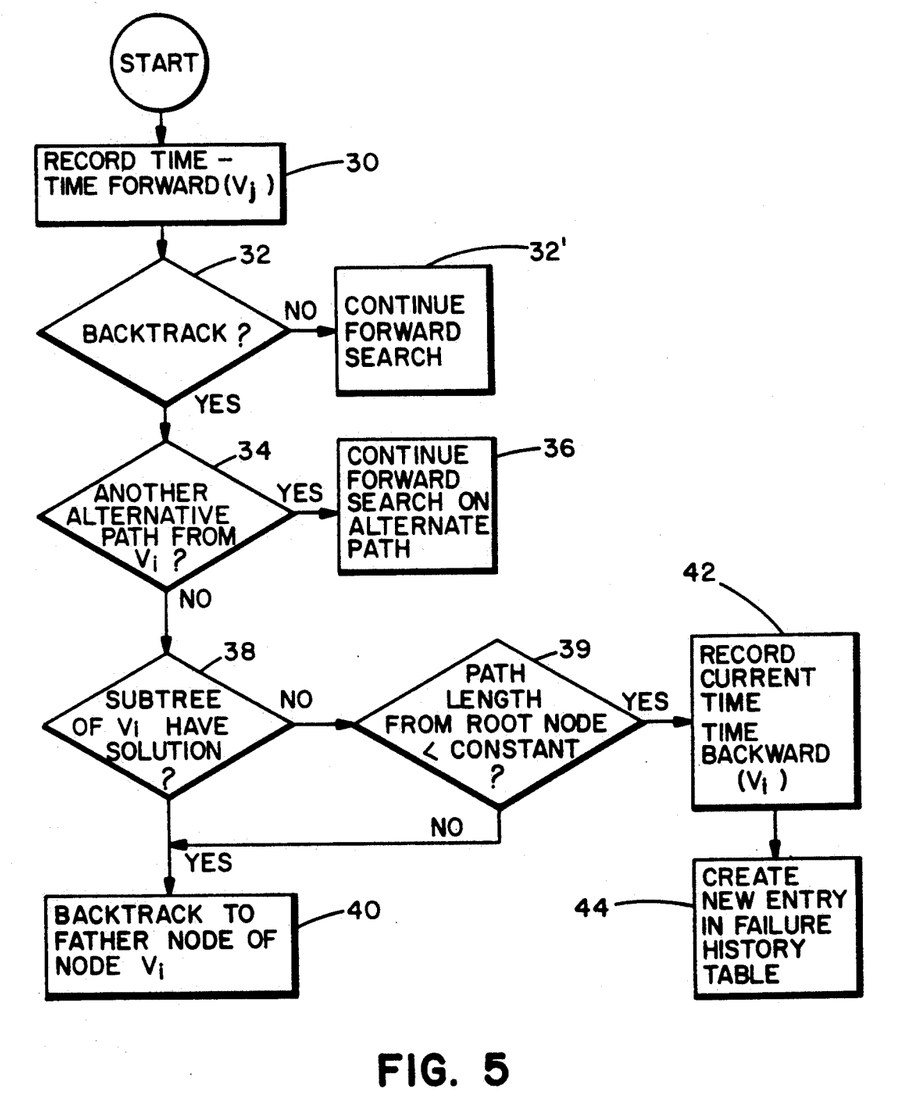
Figure 6:
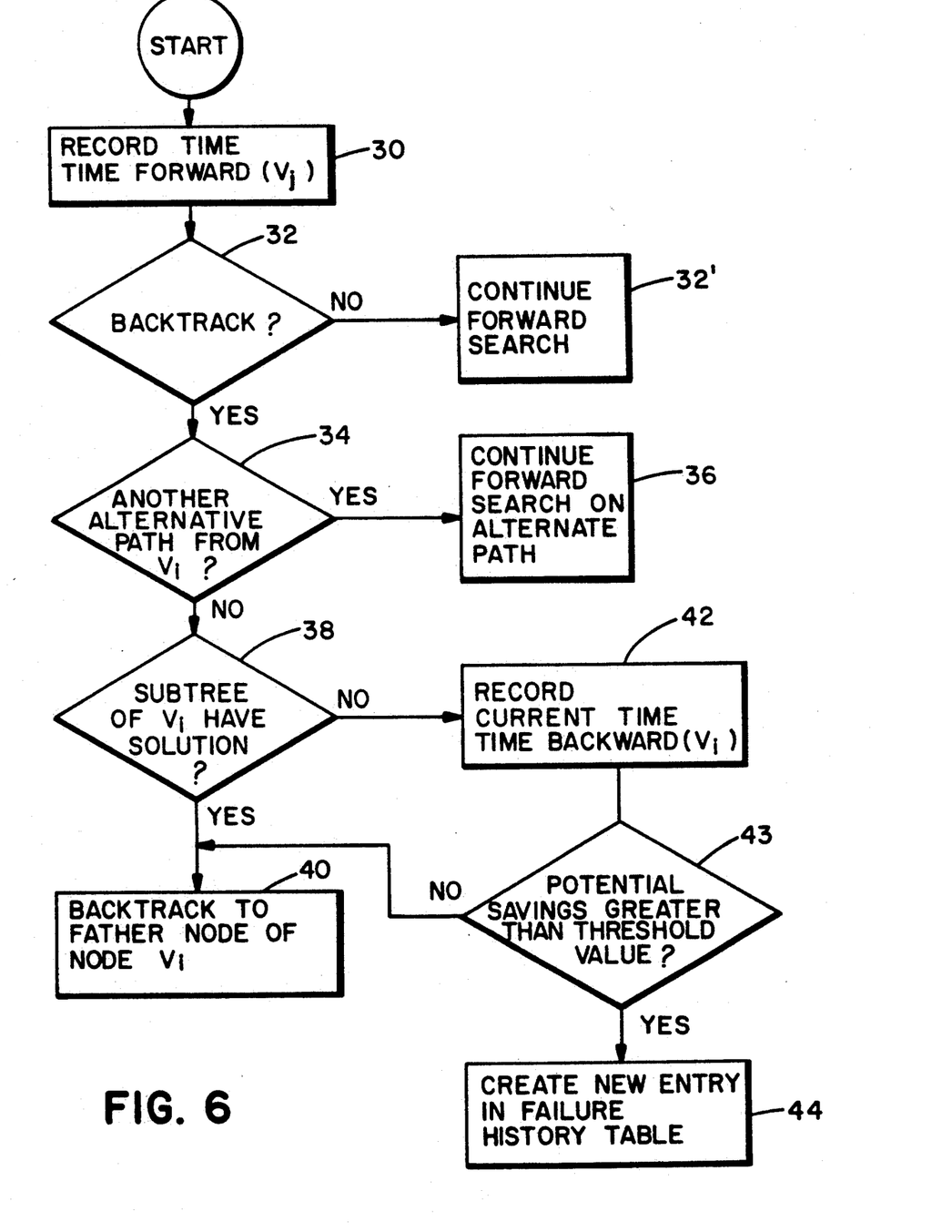

First there are described several variations of the insertion policy as illustrated in FIGS. 2a and 2b. One variation, shown in FIG. 5, is to insert an entry in the Failure History Table 20 only if the length of the path from the root node 12 to a current node in the search tree is less than a specified constant (block 39). In this regard the length of the path is considered to be a number of path "edges" from the root node 12 to the current node in the search tree 10. Another variation, shown in FIG. 6, is to insert an entry in the Table only if the value or Potential_savings determined for a node is greater than a predetermined threshold value (block 43).

Figure 7:
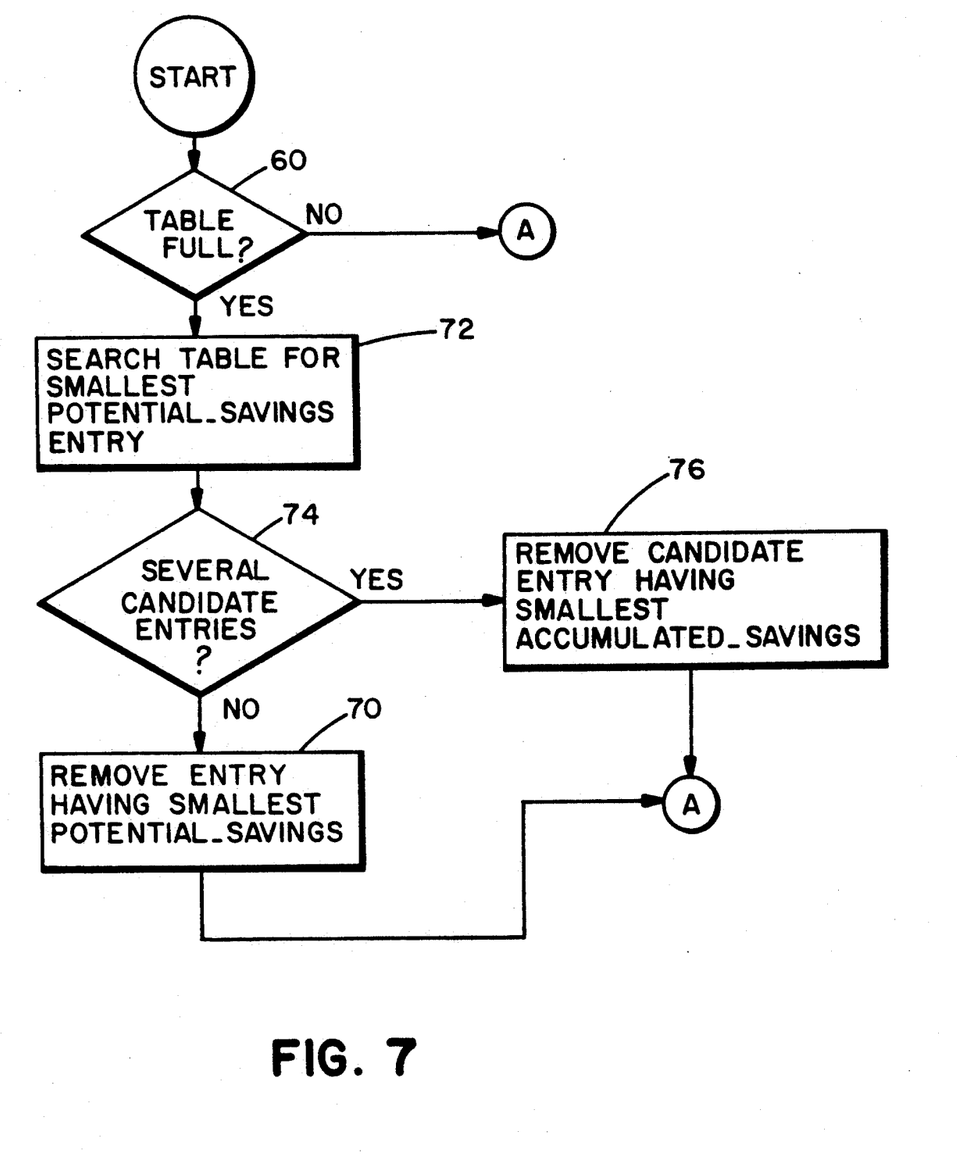
FIG. 7 is a flowchart illustrating a first variation of the method shown in FIG. 4.
Figure 8:
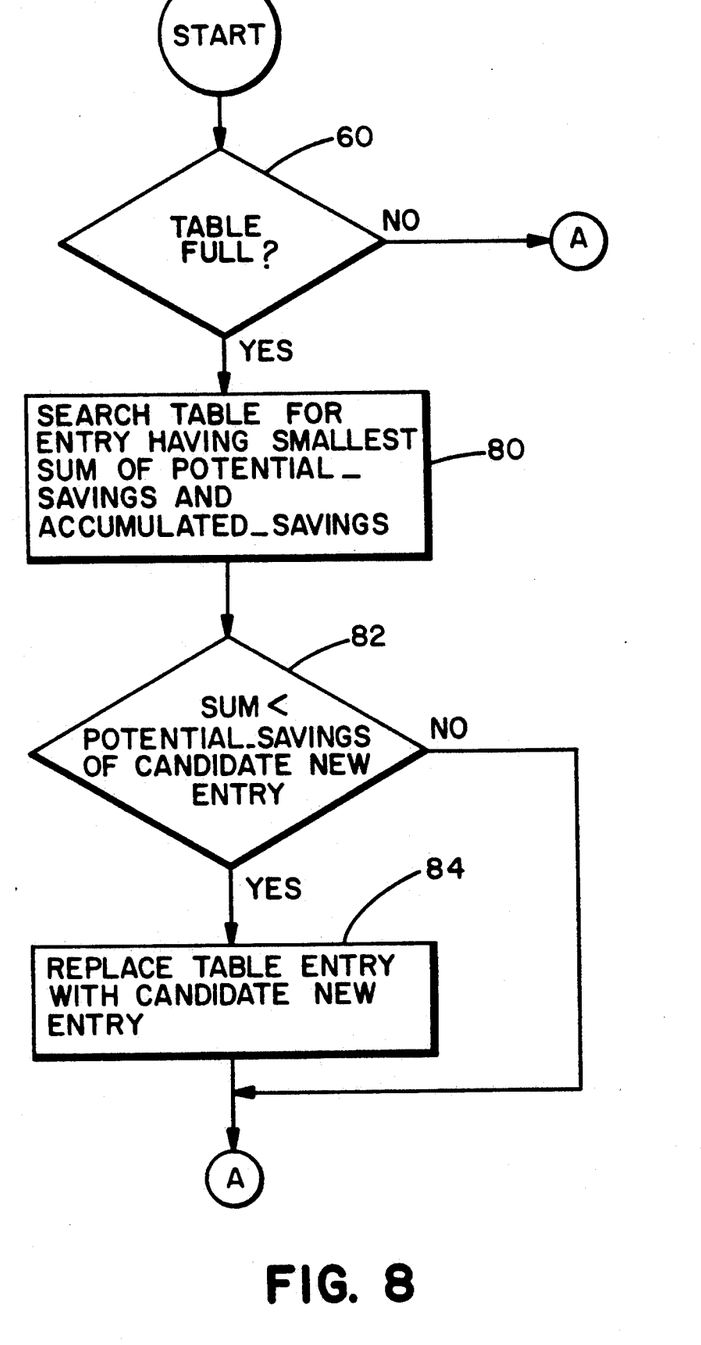
FIG. 8 is a flowchart showing a second variation of the method shown in FIG. 4.

Next there are described variations of the replacement policy illustrated in FIG. 4. One variation, shown in FIG. 7, is to remove from the Table 20 an entry having the least Potential_savings attribute value (block 70). If there are several candidates, the entry having the least Accumulated_savings attribute is removed (blocks 72, 74, and 76). Another variation, shown in FIG. 8, is to determine an entry in the table for which the sum of the Potential_savings and Accumulated_savings attributes is the smallest (block 80). If the sum is smaller than the Potential_savings of the candidate entry considered for insertion (block 82), then the candidate entry replaces the former entry (block 84).

As such, while the invention has been particularly shown and described with respect to presently preferred embodiments thereof, it will be understood by those skilled in the art that changes in form and details may be made therein without departing from the scope and spirit of the invention.

Having thus described my invention, what I claim as new and desired to secure by Letters Patent is as follows:

1. A method of improving the efficiency of solving constraint-satisfaction problems performed with a backtrack search technique that is executed by digital data processor means, comprising the steps of:

during the execution of a backtrack search upon a search tree by a digital data processor means, and prior to making a forward move from a current node of the search tree, recording a first current time value within a first storage location within the digital data processor means;

in response to a detection of a failure path during the execution of the backtrack search upon the search tree by the digital data processor means, inserting an entry into a data structure contained within a memory of the digital data processor means, the entry including information relating to the failure path, including a cost of searching the failure path, wherein the step of inserting includes a step of inserting the entry into a failure history table having an entry for each detected failure path, wherein each entry has at least three attribute fields for storing information expressive of a Binding_set attribute, a Potential_savings attribute and an Accumulated_savings attribute for the associated failure path, wherein the Binding_set attribute field is provided to store a current value of the bindings of variables associated with a path from a root node of the search tree to the current node of the search tree, wherein the Potential_savings attribute field and the Accumulated_savings attribute field are both provided to store information expressive of a savings in processing time for the digital data processor means, and wherein a value stored within the Potential_savings attribute field is determined in accordance with the recorded first time value; and examining, with the digital data processor means, the entries of the data structure during a subsequently performed backtrack search in order to avoid paths of the search tree that are identified to be failure paths, wherein the step of inserting an entry includes an initial step of determining if a newly inserted entry would cause the failure history table to overflow.

2. A method as set forth in claim 1 wherein, in response to an occurrence of a backtrack to the current node of the search tree due to an identification of a failure path by the digital data processor means, the method further includes the steps of determining if an alternative forward path from the current node exists;

determining, if no alternative forward path from the current node is determined to exist, if a subtree rooted at the current node contains at least one solution; and if the subtree is determined not to contain at least one solution, recording a subsequent current time value within a second storage location within the digital data processor means; and performing the step of inserting an entry into the failure history table, wherein the step of inserting an entry into the failure history table includes the steps of:

recording in the associated Binding_set attribute field a current value of the bindings of variables associated with a path from a root node to the current node;

recording in the associated Potential_savings attribute field a value of a difference between the recorded first current time value and the recorded subsequent current time value; and recording in the associated Accumulated_savings attribute field a value of zero.

3. A method as set forth in claim 2 wherein the step of inserting an entry into the failure history table includes the additional steps of:

determining if another entry in the failure history table has a Binding_set attribute field that stores an associated binding set that is more restrictive than a binding set of the entry last inserted into the failure history table; and removing from the failure history table any entry having a binding set determined to be more restrictive than the binding set of the entry last inserted.

4. A method as set forth in claim 3 wherein the step of determining if an entry in the failure history table has a Binding_set attribute field that stores an associated binding set that is more restrictive than a binding set of the entry last inserted into the failure history table is accomplished in accordance with a criteria expressed as: a first binding set $S_x$ is considered more restrictive than another binding set $S_y$ if the variables and their associated bound values in $S_y$ are a subset of the variables and their associated values in $S_x$.

5. A method as set forth in claim 1 wherein, if it is determined that a newly inserted entry would cause the failure history table to overflow, the method includes the additional steps of:

examining entries of the failure history table so as to identify an entry within the failure history table having a smallest value recorded within the associated Accumulated_savings attribute field;

comparing the value recorded within the Potential_savings attribute field of the identified entry to a value of the Potential_savings attribute of the entry to be inserted into the failure history table; and replacing the identified entry within the failure history table with the entry to be inserted only if the value of the Potential_savings attribute of the entry to be inserted is larger than the value recorded within the Potential_savings attribute field of the identified entry.

6. A method as set forth in claim 5 wherein, if the step of examining entries identifies a plurality of entries, the method includes a step of selecting, as a candidate entry to be replaced, an identified entry having a smallest recorded value within the Potential_savings attribute field.

7. A method as set forth in claim 1 wherein the step of examining includes the steps of:

before performing a forward move from a current node of the search tree, determining if a value of a current set of bindings corresponding to a path from a root node of the search tree to the current node is already present within a Binding_set attribute field of an entry within the failure history table;

if the current set of bindings is determined to be already present in an entry within the failure history table, the method includes the steps of:

increasing the value recorded within the Accumulated_savings attribute field of the determined entry, the value being increased by the value recorded within the Potential_savings attribute field of the determined entry; and backtracking to a father node of the current node.

8. A method as set forth in claim 1 wherein the step of inserting an entry into the failure history table is accomplished only if a length of a path from the root node of the search tree to the current node is less than a specified length.

9. A method as set forth in claim 1 wherein the step of inserting an entry into the failure history table is accomplished only if a value of the Potential_savings attribute of an entry to be inserted is greater than a predetermined threshold value.

10. A method as set forth in claim 1 wherein, if it is determined that a newly inserted entry would cause the failure history table to overflow, the method includes the additional steps of identifying an entry having a Potential_savings attribute field of least value; and removing from the failure history table the identified entry having the Potential_savings attribute field of least value.

11. A method as set forth in claim 10 wherein, if there are identified a plurality of entries having a Potential_savings attribute field of least value, the method includes a step of removing an identified entry having an Accumulated_savings attribute field of least value.

12. A method as set forth in claim 1 wherein, if it is determined that an insertion of a further entry into the failure history table would cause the failure history table to overflow, the method includes the additional steps of:

identifying an entry within the failure history table for which a sum of the values recorded within the Potential_savings attribute field and the Accumulated_savings attribute field is less than that of other entries within the failure history table; and if the sum is also smaller than the Potential_savings attribute of the further entry to be inserted within the failure history table, replacing the identified entry within the failure history table with the further entry.

13. A method as set forth in claim 1 and including an initial step of assigning all failure history table attribute fields to a null value.

14. Apparatus for solving instances of a constraint-satisfaction problem with a backtrack tree search technique, comprising:

data processing means coupled to memory means for storing, within the memory means, a data structure having entries, each of the entries being comprised of at least three attribute field including a Binding_set attribute field, a Potential_savings attribute field, and an Accumulated_savings attribute field, individual ones of the entries each being associated with a known failure path of a search tree; the data processing means including means for executing a first backtrack tree search procedure, said executing means including means for inserting an entry into the data structure in response to an occurrence of a failure path identified during the first backtrack tree search procedure; said executing means further including means for examining the entries of the data structure during a subsequent performed backtrack tree search procedure in order to avoid those paths of the search tree previously identified to be failure paths, wherein, for each of the entries, the Binding_set attribute field is provided to store a current value of the bindings of variables associated with a path from a root node of the search tree to a current node of the search tree, wherein the Potential_savings attribute field and the Accumulated_savings attribute field are both provided to store information expressive of a savings in processing time for the data processing means; and means for recording, within a storage location of the data processing means, a value of a current time, the current time value being recorded prior to the data processing means executing a forward move from the current node of the search tree, and wherein a value stored within one of the Potential_savings attribute fields is determined in accordance with the recorded current time value.

15. Apparatus as set forth in claim 14 wherein said executing means further includes means, responsive to an occurrence of a backtrack to the current node of the search tree due to an identification of a failure path, for determining if an alternative forward path from the current node exists; for determining, if no alternative forward path from the current node is determined to exist, if a subtree rooted at the current node curtains at least one solution; for recording, if the subtree is determined not to contain at least one solution, a value of a subsequent current time value; and means for inserting an entry into the data structure to record data associated with a backtrack tree search processing state that forced the backtrack to the current node to occur, the means for inserting an entry including means for recording within the associated Binding_set attribute field a current value of the bindings of variables associated with a path from the root node to the current node; means for recording within the associated Potential_savings attribute field a value of a difference between the first current time value and the subsequent current time value; and means for recording within the associated Accumulated_savings attribute field a null value.

* * * * *